Nov. 20, 1956 — J. FILLIP — 2,771,016
CULTIVATOR ATTACHMENT FOR TRACTORS
Filed Aug. 5, 1954 — 2 Sheets-Sheet 1

INVENTOR.
Jerome Fillip
BY Victor J. Evans & Co.
ATTORNEYS

Nov. 20, 1956  J. FILLIP  2,771,016
CULTIVATOR ATTACHMENT FOR TRACTORS
Filed Aug. 5, 1954  2 Sheets-Sheet 2
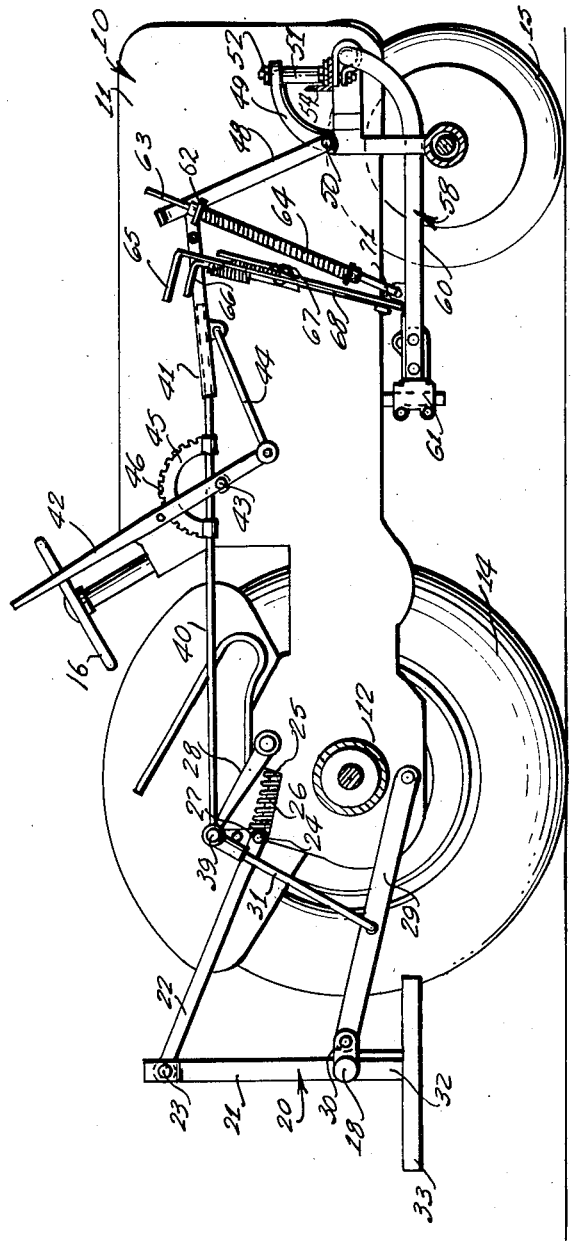
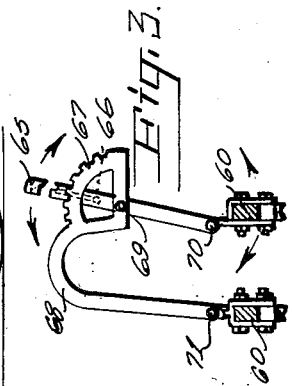
INVENTOR.
Jerome Fillip
BY *Victor J. Evans & Co.*
ATTORNEYS

United States Patent Office 2,771,016
Patented Nov. 20, 1956

2,771,016

CULTIVATOR ATTACHMENT FOR TRACTORS

Jerome Fillip, Ammansville, Tex.

Application August 5, 1954, Serial No. 447,968

1 Claim. (Cl. 97—47.34)

This invention relates to agricultural equipment, and more particularly to a means for attaching a cultivator to a tractor.

The object of the invention is to provide a mounting means which will permit a cultivator to be readily attached to or detached from a tractor, such as a Ford tractor.

Another object of the invention is to provide a cultivator attachment for Ford and Ferguson tractors, wherein the sweeps can be mounted close to the respective axles so that there will be less variation in the cutting depth over uneven ground, the mounting of the present invention permitting the cultivator to be attached to the tractor without any alterations or changes to the tractor, there being an adjusable means provided whereby the sweeps or cultivator feet can be adjusted with respect to the wheels so that the wheels travel in furrows.

A still further object of the invention is to provide a cultivator attaching means which permits the front wheels to be turned without any interference and whereby the tractor hydraulic system is used for automatically adjusting the position of the parts, the sweeps being independently adjustable with respect to each other.

A further object of the invention is to provide a mounting means which is extremely simple and inexpensive to manufacture.

Other objects and advantages will be apparent during the course of the following description.

In the accompanying drawings, forming a part of this application, and in which like numerals are used to designate like parts throughout the same:

Figure 2 is a sectional view taken on the line 2—2 of Figure 1.

Figure 3 is a sectional view taken on the line 3—3 of Figure 1.

Figure 1:
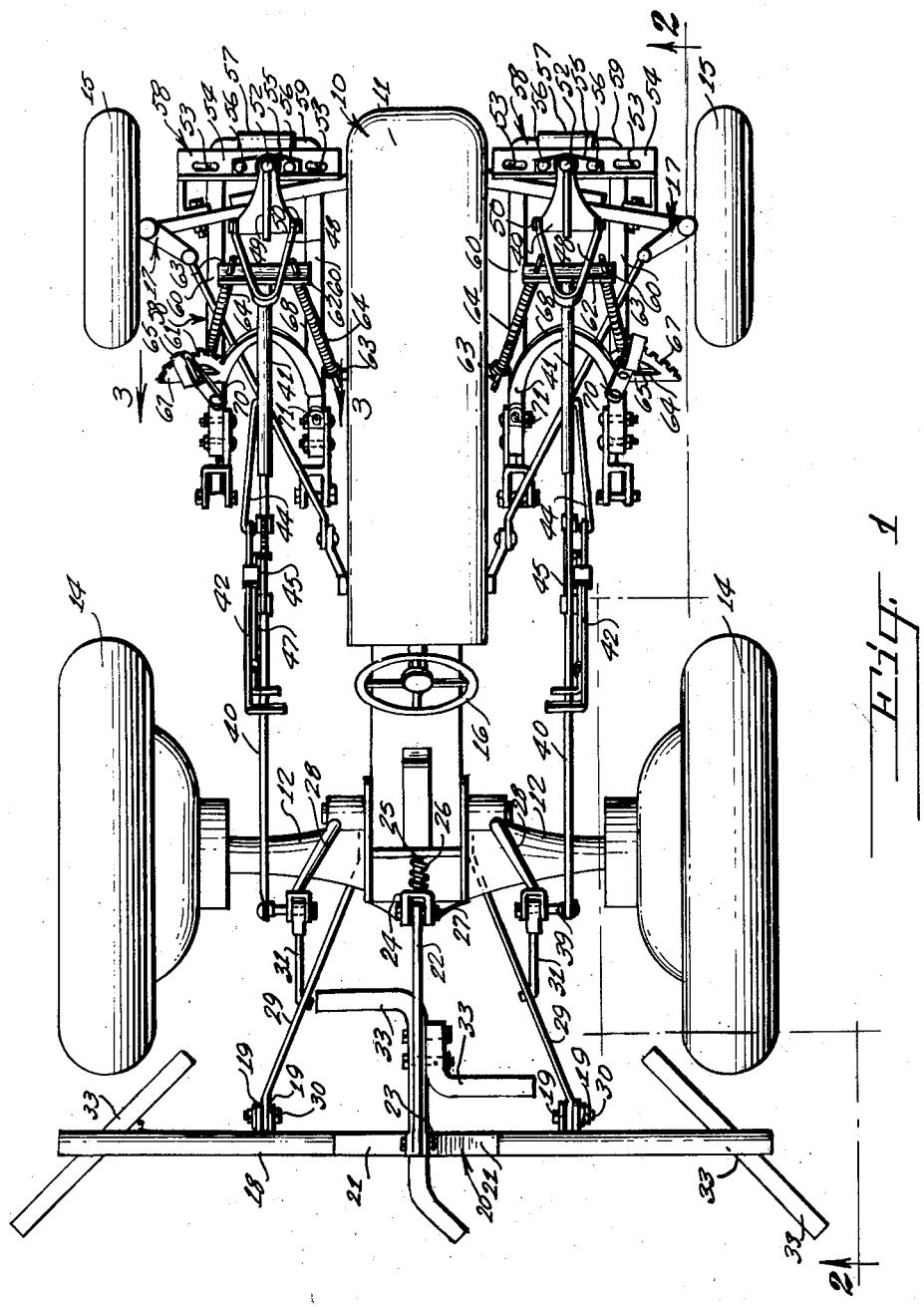
Figure 1 is a top plan view of the mounting means of the present invention showing a cultivator attached to a tractor.

Referring in detail to the drawings, the numeral 10 designates a tractor which includes a main body 11, a rear axle housing 12 and rear wheels 14. The tractor further includes the usual front wheels 15, and there is provided a steering wheel 16 for turning the wheels 15 through the medium of the usual steering mechanism.

The present invention is directed to a cultivator mounting means whereby a cultivator can be readily attached to or detached from the tractor 10.

Arranged rearwardly of the tractor 10 is a horizontally disposed mounting bar 18 which may be cylindrical in shape. Projecting forwardly from the mounting bar 18 and secured thereto are a plurality of apertured ears 19 which are arranged in pairs for a purpose to be later described. Projecting upwardly from the mounting bar 18 is a yoke 20. The yoke 20 includes a pair of angularly arranged legs 21, Figure 3, and the legs 21 have their lower ends secured as by welding to the mounting bar 18. A lever 22 has its rear end pivotally connected between the upper ends of the legs 21 through the medium of a pin or bolt and nut assembly 23. The front end of the lever 22 is pivotally connected to a bifurcated portion 24 by means of a pin 27, and the bifurcated portion 24 is formed integral with or secured to a shank 25 which has a coil spring 26 circumposed thereon. The tractor 10 is further provided with links 28 which may be actuated by the hydraulic system of the tractor in a conventional manner, and pivotally connected to the rear portion of the tractor is a pair of spaced apart arms 29. The rear ends of the arms 29 are pivotally connected to the ears 19 by means of pins or bolt and nut assemblies 30. Fingers 31 extend between the links 28 and the arms 29 so that when the links 28 are rotated or actuated by the tractor hydraulic system, the arms 29 can be raised or lowered so as to adjust the position of the cultivator feet or shoes.

Depending from the bottom of the mounting bar 18 and secured thereto in any suitable manner, as for example by welding, are a plurality of vertically disposed posts 32. Support members 33 are secured to the lower ends of the posts 32 as by welding, and suitable earth working implements may be attached to members 33.

Extending transversely from each of the hydraulic links 28 is a pin 39. Projecting forwardly from the pair of pins 39 is a pair of rods 40 which are arranged on opposite sides of the tractor body 11. A sleeve 41 is telescopically or slidably connected to the front end of each of the rods 40, and a manually operable handle 42 is pivotally connected to each of the rods 40 by means of a pin 43. A tie rod 44 interconnects the lower end of the handle 42 with the sleeve 41, Figure 2.

Mounted on each of the rods 40 is a sector plate 45 which is provided with a plurality of teeth 46, and a dog 47 is adapted to engage the teeth 46 for maintaining the handle 42 immobile in its adjusted positions. It will be seen from the drawings that there are two of the handles 42 and a dog 47 is provided for each of the handles 42.

Pivoted to the front end of each of the sleeves 41 is a bracket 48 which has a substantially V-shape. A base 49 is pivoted to each of the brackets 48 by bolts 50, and a stem 51 is connected to each base 49 by a bolt or pin 52. A strap 55 is secured to the lower end of each stem 51, and bolts 56 extend through the strap 55 and through certain of the slots 53 in an angle bar 54. Thus, by shifting the bolts 56 so that they pass through different of the slots 53, the position of the front earth working implements can be adjusted laterally so that different widths will be cultivated as desired.

There is further provided a collar 57 which is secured below each angle bar 54 in any suitable manner, as for example by welding, and the collar 57 provides a rotatable support for a movable body member 58. There is provided two of the body members 58 one for each side of the tractor, and each has the same construction. Thus, each body member 58 has a substantially U-shaped construction and each includes a web portion 59 that is rotatably mounted in the sleeve 57, and extending rearwardly from each of the web portions 59 is a pair of spaced apart fingers 60. A clamp 61 is secured to the rear end of each of the fingers 60, and the clamp 61 provides supports for suitable earth working implements.

Secured to each of the brackets 48 is a cross strip 62, and a cushioning means or shock absorbing means is provided for the front of the cultivator. This cushioning means includes rods 63 which extend between the members 62 and the body member 58. The rods 63 are lift rods for causing pivotal movement of members 58 about the horizontal axes at 59 when the handles 42 or the hydraulic lift 28 are actuated. Coil springs 64 are circumposed on the rods 63 so that in the event that the cultivators encounter an obstacle the coil springs 64 will give somewhat to permit the body members 58 to pivot safely in a clockwise direction through the medium of the pivotally mounted web portions 59 which extend through the collars 57. For manually shifting or adjusting the body members 58 and their associated earth working implements laterally, handles 65 are provided, and spring pressed dogs 66 are arranged contiguous to the handles 65 for engagement with sector plates 67. The dogs 66 will serve to maintain the handles 65 immobile in their various adjusted positions.

From the foregoing it is apparent that there has been provided a mounting means for attaching a cultivator to a tractor such as the tractor 10. In use, with the parts connected as previously described, the links 28 can be actuated by the usual hydraulic system on the tractor whereby the arms 29 can be raised or lowered and as the arms 29 are raised or lowered the mounting bar 18 will likewise be moved up or down. This vertical adjustment of the mounting bar 18 will result in adjustment of earth working implements so that the rear earth working implements can be arranged to cultivate at different depths in the ground or else the earth working implements can be raised to a sufficient depth to clear the ground, that is to be spaced above the ground as when the tractor is being driven along a road or the like. Similarly, the front earth working implements can also be adjusted depending upon the conditions under which the implement is being used. To adjust the front earth working implements, the handles 42 can be pivoted whereby the body members 58 will pivot about collars 57 so that the front earth working implements can be positioned at any desired elevation. The spring 26 acts as a hydraulic lift system shock release. The pair of handles 42 permit each body member 58 to be adjusted independently of the other, and by positioning the bolts 56 in different slots or holes 53 in the bar 54, the body members 58 and their associated earth working implements can be adjusted laterally. The handles 65 can be used for adjusting the body members laterally. With the present invention various types of cultivators can be mounted on a tractor such as the Ford tractor. The front earth working implements or the body members 58 can be adjusted laterally so that the distance between the two front sweeps on the row can be widened or narrowed. Also, the sweeps are mounted as near as possible to the respective axles to provide the shortest possible lever arm action so that there will be very little variation in cutting depths over uneven ground. The cultivator can be mounted without altering the tractor so that it is not necessary to drill additional holes or the like. The sweeps can be positioned in relation to the wheels so that the wheels travel in furrows and there will be no interference with turning or operation of the front wheels 15. The hydraulic system can be used for adjusting the rear earth working implements and the front earth working implements can be adjusted manually both as to elevation and as to lateral adjustment. The various adjustments can be quickly removed or replaced.

The sector plates 67 are secured to the beam 60 and it is necessary to squeeze the handle 65 so that it will release the pin on the sector plate and the handle is moved laterally to laterally adjust the front sweeps. When the handles 42 are moved forward or backward, the cylinder 41 telescopes over the rod 40 and lowers or raises the front sweeps.

The sector plate 67 is formed integral with or secured to a yoke 68, and the yoke 68 may be pivotally connected to one of the members 60 by a pivot pin 71. The handle 65 is pivotally connected to the lower portions of the yoke 68 by means of a pin 69, and the lower end of each of the handles 65 is pivotally connected to one of the members 60 by a pivot assembly 70. The handle 65 is one straight solid piece of material and is pivotally connected to one of the sweep arms 60 by means of a pin 70 and is also pivotally connected in place by means of the pin 69. There is one bearing member 57 for each member 58, and there is a small amount of play between the various connecting parts so that pivotal movement can be effected. Also the members 51 and 52 serve as a pivot connection. The sleeve 41 is pivoted to the bracket 48 and the bracket 48 is pivoted to the base 49 and 50. The member 49 is fixed to the tractor and the angle 54 is held in position due to its securement to the bracket 49. The body members 58 may be made of spring steel having some resiliency and the spaced apart fingers 60 are long enough and far enough apart so that the rear ends thereof can be moved towards and away from each other by the handles 65.

I claim:

In combination, a tractor including a body, front wheels and rear wheels, a horizontally disposed mounting bar of cylindrical shape positioned rearwardly of said tractor and provided with a plurality of apertured ears, said ears being arranged in pairs, a yoke extending upwardly from said mounting bar and including a pair of angularly arranged legs, a lever having one end pivotally connected to said legs and its other end connected to said tractor body, a plurality of vertically disposed posts depending from said mounting bar, support members secured to the lower ends of said posts and adapted to support earth working implements, hydraulically actuated links connected to the tractor body, a pair of angularly arranged arms pivotally connected to the ears on said mounting bar, and pivotally connected to said tractor body, fingers extending between said links and said arms, a pin extending transversely with respect to each of said links, a pair of rods arranged on opposite sides of the tractor body and pivotally connected to said pins, a sector plate mounted on each of said rods and provided with a plurality of teeth, a sleeve slidably connected to the front of each of said rods, a handle pivotally connected to each of said rods, dogs carried by said handles for engaging the teeth of said sector plates, a tie rod pivotally connecting the lower end of said handle to said sleeve, brackets pivotally connected to the front of said sleeves, a base pivotally connected to the lower end of each of said brackets and said bases being secured to the tractor, a standard connected to each base, a strap secured to the lower end of each standard, an angle bar adjustably connected to each strap, a collar positioned below each angle bar, a substantially U-shaped body member having a web portion pivotally mounted in each collar and including rearwardly extending spaced apart fingers, lift rods extending from said brackets to said fingers, and earth working implements connected to said fingers.

References Cited in the file of this patent
UNITED STATES PATENTS

| | | |
|---|---|---|
| 1,911,306 | Cady | May 30, 1933 |
| 2,012,853 | Heitshu | Aug. 27, 1935 |
| 2,118,180 | Ferguson | May 24, 1938 |
| 2,221,332 | Sibel | Nov. 12, 1940 |
| 2,561,650 | Carlson | July 24, 1951 |
| 2,636,428 | Pratt | Apr. 28, 1953 |